INVENTOR.
Felton V. Crowe

ATTORNEY

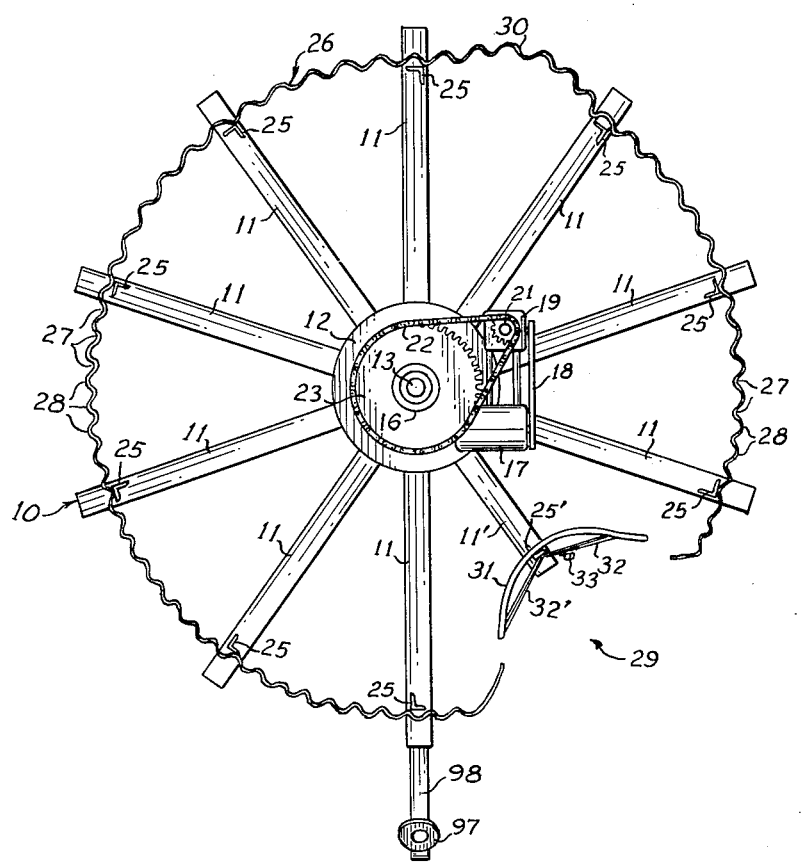
Fig. 2
INVENTOR.
Felton V. Crowe
BY 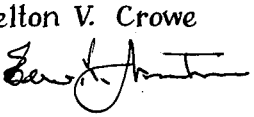
ATTORNEY

Aug. 10, 1965  F. V. CROWE  3,199,550
AUTOMATIC BAGGING APPARATUS
Filed July 3, 1961  5 Sheets-Sheet 4

INVENTOR.
Felton V. Crowe
BY
ATTORNEY

Aug. 10, 1965  F. V. CROWE  3,199,550
AUTOMATIC BAGGING APPARATUS
Filed July 3, 1961  5 Sheets-Sheet 5
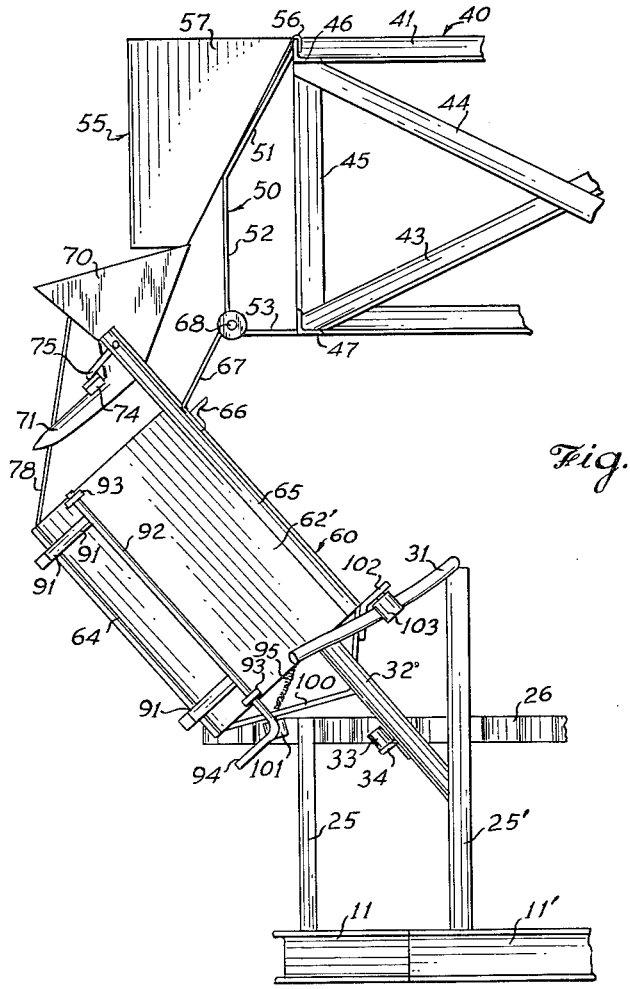
Fig. 8
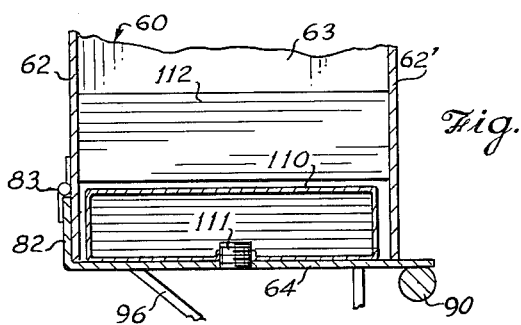
Fig. 9
INVENTOR.
Felton V. Crowe
BY 
ATTORNEY United States Patent Office 3,199,550
Patented Aug. 10, 1965

3,199,550
AUTOMATIC BAGGING APPARATUS
Felton V. Crowe, 2616 Fairoaks Road, Decatur, Ga.
Filed July 3, 1961, Ser. No. 121,526
7 Claims. (Cl. 141—76)

This invention relates to automatic bagging apparatus, and is more particularly concerned with a device for filling bags with aggregates, such as gravel or other granular material.

In the past, many machines have been devised to fill containers with gravel, sand, and other granular materials. Many of these machines use electric vibrators to shake the container in order to pack the material. Incorporating a plurality of electric vibrators in a machine is expensive and adds to the complexity of the machine with an accompanying increase in maintenance costs.

The device of the present invention overcomes the above objections by providing an automatic bagging machine which requires only one operator.

Briefly, the present invention comprises a rotatable frame turntable having a plurality of radially spaced bag filling assemblies secured to the periphery thereof. Each assembly includes a chute mounted to the turntable and a receptacle pivotally mounted below each chute, the receptacle carrying a hopper with a spout which feeds material to a bag within the receptacle from the hopper. Upon rotation of the turntable the receptacles are respectively reciprocated in pendulum fashion by cam followers which ride along a serrated or sinusoidal surface of an arcuate cam track, the ends of the cam track terminating in spaced relationship. Thus, vibratory motion is imparted to the bags within the receptacle, the bags being righted toward the later portion of the cycle for a sufficient time to permit additional material to be secured. When the bag within each receptacle is filled, the receptacle clears the end of the cam track and is tilted by a second cam inwardly. The door is then opened, and the bag falls out. Automatic clamping means, operable by the door of the receptacle, secure the bag in place during the filling operation.

It is, therefore, an object of the present invention to provide an automatic bag filling apparatus which will successively and automatically fill and discharge in a predetermined location self-sealing valve bags.

It is another object of the present invention to provide an automatic bag filling apparatus wherein the bags are vibrated and righted during the filling operation so as to compact the material in the bag during delivery of the material to the bag.

A further object of the present invention is to provide an automatic bagging machine which will fill bags, pack the contents thereof, and discharge bags of the self-sealing valve type.

A further object of the present invention is to provide an automatic bagging apparatus which is simple and durable in construction, efficient in operation, and well designed to meet the demands of economic manufacture.

Other and further objects, features and advantages will become apparent from consideration of the following specification taken in conjunction with the accompaying drawings in which:

FIG. 2 is a horizontal sectional view of the base drive means and the cam tracks of the device shown in FIG. 1.

FIG. 8 is a view similar to FIG. 4, showing the receptacle as it approaches a discharging position.

FIG. 9 is a view of a detail showing the means for securing the adapters for smaller sizes of bags.

Figure 1:
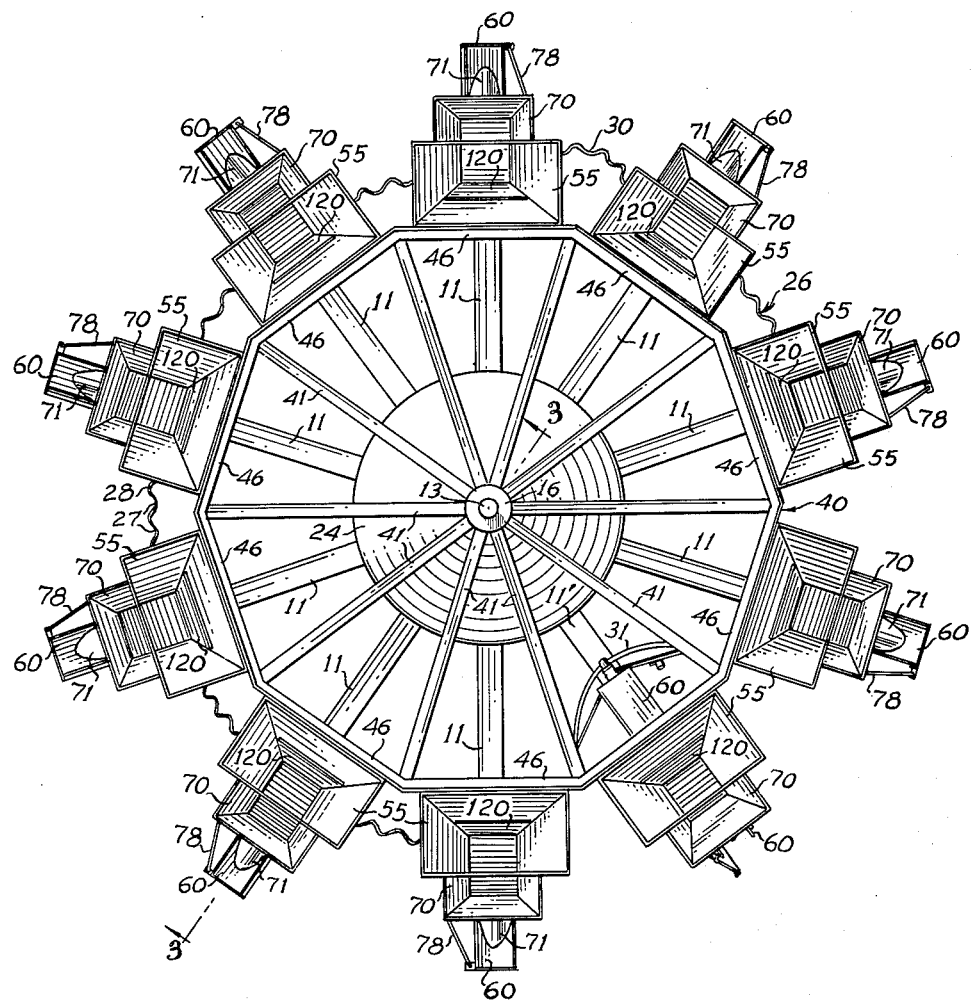
FIG. 1 is a top plan view of one preferred embodiment of the present invention.

Referring now in detail to the embodiment chosen for the purpose of illustrating one form of the inventive concept of the present invention, numeral 10 denotes the flat base of the bagging machine, the base 10 being supported on a suitable floor. In more detail, the base 10 comprises a plurality of evenly spaced radially extending I beams 11 and a shorter I beam 11', all joined at their inner portion by a hub plate 12, seen in FIG. 3. A vertical upstanding standard 13 is carried by the central portion of base 10, the standard being provided with spaced, press fitted bearings 14 and 15 which are received in the counterbored ends of a central sleeve 16 of a turntable or superstructure 40. The sleeve 16 is supported by and adapted to rotate on bearings 14 and 15 about the standard 13.

Figure 3:
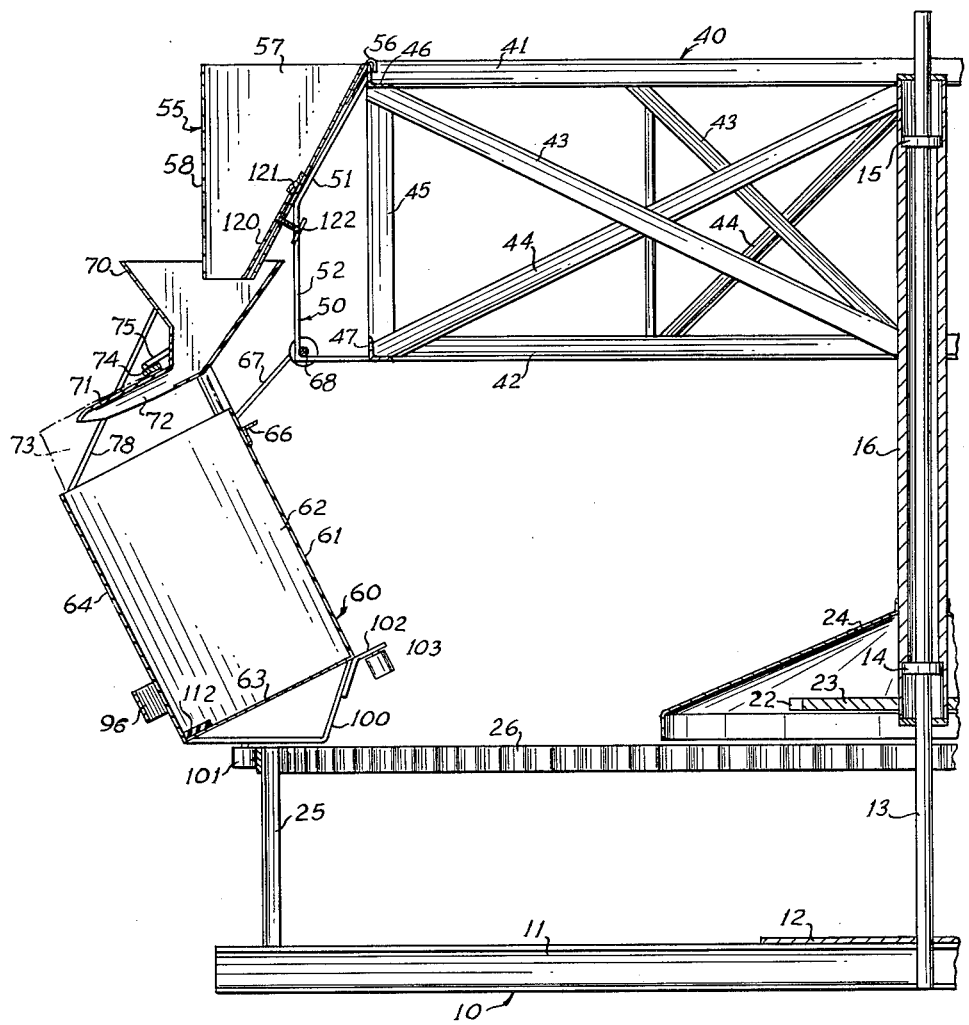
FIG. 3 is a cross sectional view taken substantially along the line 3—3 in FIG. 1.

Mounted on the hub plate 12 is a motor 17, seen in FIG. 2, which drives, through belt 18, a gear reducer 19 having a sprocket 21. Sprocket 21 drives, through a continuous chain 22, a sprocket 23 fixed on the lower end of sleeve 16. Thus, upon energization of motor 17, the sleeve 16 is rotated in a clockwise direction, as viewed in FIG. 2. To protect the sprockets 21 and 23 and chain 22 from dirt and dust, a cone-shaped cover 24, seen in FIG. 3, is secured to the lower portion of sleeve 16.

At the outer end portions of the beams 11 are a plurality of upstanding brackets 25, all approximately the same distance radially from the center of base 10 and from sleeve 16. The brackets 25 all terminate in a horizontal plane above and spaced from the base 10. Preferably, the plane of the upper ends of brackets 25 is slightly below the plane of sprocket 23, as seen in FIG. 3.

Around the upper end portions of brackets 25 is an arcuate cam track 26, the purposes of which will be described later. The cam track 26 is made from a flat rectangular sheet of metal which is corrugated or serrated along its width to form sinusoidal waves comprising outwardly concave valleys 27 and outwardly convex ridges 28 vertically disposed alternately throughout the length of the cam track. It will be observed in FIG. 2 that the cam track 26 is generally circular, lying in a horizontal plane parallel to and above base 10. In one quadrant, however, the cam track 26 is discontinued or interrupted for about 30° of an arc to provide a space 29 adjacent the loading and unloading zone of the machine.

In a quadrant immediately preceding this loading and unloading quadrant, the cam track 26 protrudes outwardly from its arc to provide a generally outwardly convex or arcuate node 30, the purpose of which is to right the bag as will be more fully described hereinafter.

It will be observed in FIG. 2 that the shorter beam 11' bisects the space 29 between the ends of the cam track 26 and is provided with an upstanding bracket 25' which is longer than brackets 25. As best seen in FIG. 8, the upper end of bracket 25' supports the central portion of a U-shaped, receptacle opening, cam 31, the diverging ends of which are supported by straps 32, 32', the straps 32, 32' extending up from the central portion of bracket 25'. The arrangement is such that the U-shaped cam 31 is above the cam track 26 with both ends of the cam 31 extending outwardly and downwardly, to terminate inwardly of the cam track 26 within the space 29.

About midway of the forward strap 32 is a trip or tripping roller 33 supported by a brace 34 on strap 32. The tripping roller 33, as seen in FIG. 2, is forward of the central portion of cam 31 so that it may serve as a means for opening each of the bag carrying members as will be described in more detail hereinafter.

At the upper end of the standard 13 and supported for rotation by the sleeve 16 is a turntable denoted generally by numeral 40. The turntable 40 is disposed in a horizontal plane so as to overhang the base 10 and the cam track 26. In more detail, the turntable 40 comprises a plurality of equally spaced, radially extending cantilever frames, each frame including a pair of parallel upper and lower beams 41 and 42 secured by their inner ends to sleeve 16 and spaced one over the other in the same vertical plane. Criss-crossed struts 43 and 44 extend from the extremity of one beam 41 to the opposite extremity of the other beam to reinforce the beams 41 and 42. The outer ends of each upper beam 41 are connected to the outer end of its associated lower beam 42 by a vertically disposed strap 45.

The outer ends of the adjacent beams 41 are joined by supporting bar 46, the various supporting bars 46 forming an upper polygon frame joining the ends of all beams 41. In like manner, the outer ends of adjacent beams 42 are joined by a supporting bar 47, the various supporting bars 47 forming a lower polygon frame in registry with and spaced below the upper polygon frame. It is therefore seen that the turntable 40 is a frame polyhedron which is supported at its hub for rotation in a horizontal plane, the motor 17 forming a means by which the turntable is rotated. The diameter of turntable 40 is smaller than the diameter of the cam track for purposes to be described hereinafter.

Figure 4:
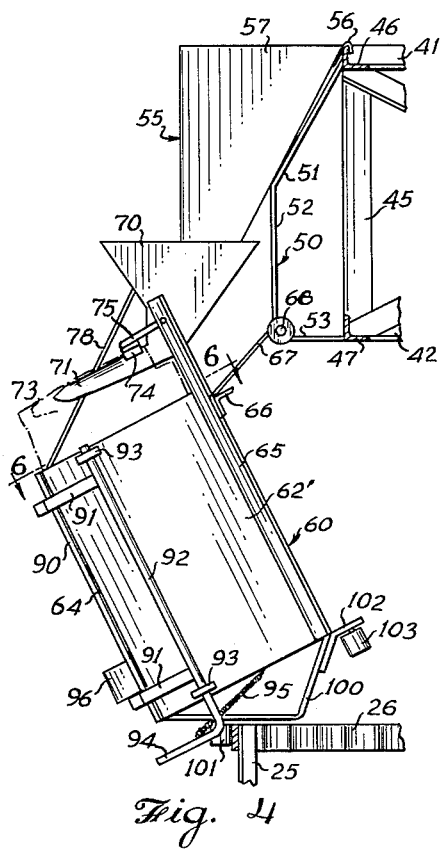
FIG. 4 is a fragmentary side elevational view of one of the hopper-spout-receptacle assemblies of the device shown in FIG. 1, the supporting structure therefor being broken away.

Supported by each pair of supporting bars 46 and 47 is a pair of outwardly facing, spaced, vertically disposed brackets denoted generally by numeral 50, the brackets 50 being somewhat U-shaped and having their ends secured to the supporting bars 46 and 47, respectively. As seen in FIG. 4, each bracket 50 includes an upper, outwardly and downwardly inclined chute supporting strap 51, a vertically disposed web 52 and an inwardly extending lower arm 53 connecting the lower end of web 52 to bar 47.

Figure 5:
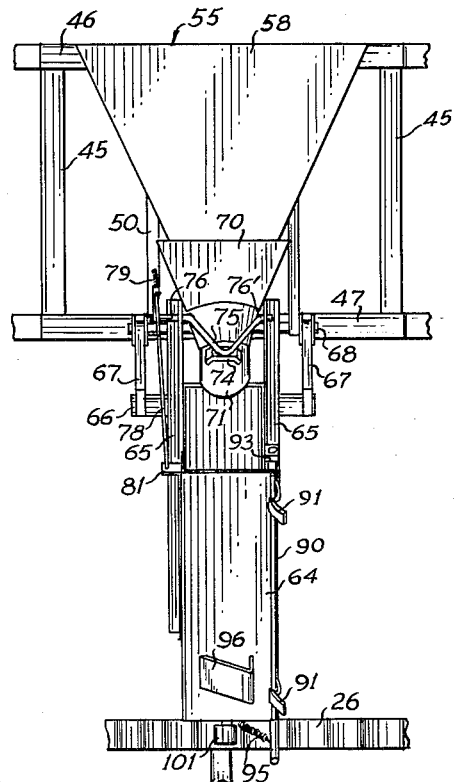
FIG. 5 is a front elevational view of the assembly shown in FIG. 4.

As best seen in FIGS. 3, 4 and 5, the inclined straps 51 of each pair of brackets 50 support the inner flat back 54 of a chute 55 at the proper inclination, the upper end of the back 54 being provided with a wide hook 56 which extends over the upper edge of bar 46. The chute 55 includes downwardly converging end plates 57 and a trapezoidal shaped front 58. It is therefore seen that along the periphery of the turntable 40 there are a plurality of adjacent or juxtaposed, removably mounted chutes 55 in the same horizontal plane and at the same distance from the hub of the turntable 40.

Below each chute 55 is a bag carrying member which includes a tiltable, inwardly and downwardly inclined bag receptacle 60. Each bag receptacle 60 is an open ended box shaped member having back 61, sides 62, 62', a bottom 63 and a hinged front or door 64. Secured along the inner edges of sides 62 are a pair of spout supporting arms 65 which extend outwardly beyond the upper surface of the receptacle 60. Adjacent the upper end of receptacle 60 is carrier bar 66 disposed horizontally and secured by its central portion to back 61 and arms 65. The outer ends of the bar 66 protrude beyond arms 65 and are provided with spaced straps 67 which extend upwardly and inwardly, the end of straps 67 extending around the end portions of a pivot shaft 68. Pivot shaft 68 is carried by the lower corners of straps 50, i.e. the corners formed by the webs 52 and arms 53. Thus, the receptacle 60 is free to pivot about shaft 68 and normally hangs pendent in a forwardly and upwardly inclined direction.

Rigidly fixed to the upper ends of arms 65 for pivoting with the receptacle 60 is a hopper 70 having inwardly and downwardly tapering walls terminating in a right angularly disposed spout 71. The open upper end of hopper 70 is sufficiently large in area to encompass the lower end portion of chute 55 as seen in FIGS. 3, 4 and 5, the lower end of chute 55 projecting a short distance into the upper end of hopper of 70. The hopper 70 is therefore free to pivot with receptacle 60 from the position shown in FIGS. 3, 4 and 5 to the position shown in FIG. 8.

The spout 71 in cross section is elliptical and has an opening 72 along its outer lower surface to provide a channel from the hopper 70 to the mouth of a self-sealing bag 73 retained within the receptacle 60. As seen in FIGS. 3, 4 and 8, the spout 71 is essentially parallel to the bottom 63 of the receptacle and is in a plane normal to the axis or center line of receptacle such that the spout may protrude through the overlapped lips of a self-sealing bag 73 when the bag 73 is disposed within the receptacle and yet disengage readily from the bag when it is moved out of door 64.

Adjacent the inner end on the top of spout 71 is a latch plate 74 over which the upper lip of bag 73 extends when the bag 73 is properly installed for filling. Co-operating with this latch plate 74 is a latch or clamping finger 75, the clamping finger 75 applying pressure to the lip of bag 73 when the door 64 is closed. In more detail, the clamping finger 75 is a cylindrical rod bent to form a V-shaped member, the apex of which is over the latch plate 74. The diverging arms of the V-shaped member or finger 75 extend inwardly and terminate in aligned outwardly extending rods 76, 76' journalled by the arms 65.

Figure 7:
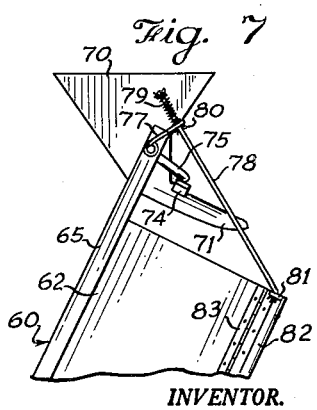
FIG. 7 is a fragmentary side elevational view of the spout and receptacle together with the bag clamping arrangement of the device shown in FIG. 1.

Rod 76 extends outwardly beyond its arm 65 and is provided with a radially extending lever 77, best seen in FIG. 7. The outer end of lever 77 is provided with an eye or hole through which slidably protrudes an actuator rod 78. The upper end of rod 78 is provided with a helically wound spring 79 which encompasses the upper end portion of rod 78, being fixed thereto at its upper end. The other end of spring 79 acts against the lever 77 to yieldably urge the lever 77 against a cotter pin 80 projecting through the rod 78.

At its opposite or lower end, the rod 78 is swivelly connected to a lever arm 81, the lever arm 81 extending from door 64. The arrangement is such that when door 64 is opened, the rod 78 is urged upwardly and inwardly, thereby urging the cotter pin 80 against lever 77 to cause counterclockwise rotation of rod 76 for lifting the latch finger 75 from the latch plate 74.

While it will be understood that several types of release mechanisms for discharging the bags 73 may be employed, I prefer to utilize the hinged door 64. This door 64 is larger than the opening which it covers and includes an inwardly turned hinge flange 82 along one edge, the flange 82 being normal to the door 64 on the outside of its side 62. A piano hinge 83 is secured between the outer surface of side 62 and the flange 82. The lever arm 81 is preferably secured to the flange 82 of door 64. It is therefore seen that the hinge 83 and the lever 77 are on the same side of the receptacle 60.

Figure 6:
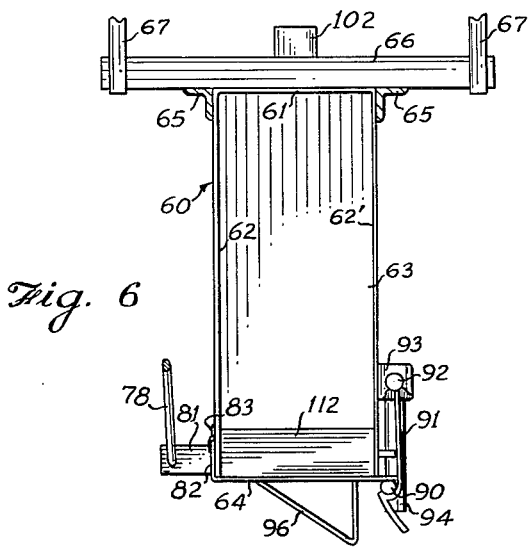
FIG. 6 is an enlarged cross sectional view taken substantially along the line 6—6 in FIG. 4.

On the other side of the receptacle 60 is the hasp assembly by means of which the door 64 is locked or latched closed during a portion of the operating cycle of the machine and then released. The hasp assembly includes a cylindrical rod 90 fixed to the door 64 along its outer surface adjacent its free edge, as shown in FIGS. 5 and 6. A pair of spaced catches 91 extend adjacent the side 62' of receptacle and releasably engage rod 90. The inner ends of catches 91 are fixed to a pivot rod 92 journalled by bearings 93 on side 62'. The lower end of rod 92 protrudes below the surface of bottom 63 and is bent outwardly to form a releasing lever 94. A spring 95, connected between an intermediate portion of lever 94 and bottom 63, urges the lever 94 in a direction to urge catches 91 into locking engagement with the rod 90. The lever 94 is adapted to cooperate with tripping roller 33.

The door 64 is also provided with a door closing cam 96 which is a flat metal plate bent to an acute angle and secured by its ends to the central surface of door 64, thereby providing an inclined surface which diverges from the plane of door 64. This cam 96 is adapted to cooperate with a roller 97, seen in FIG. 2, the roller 97 being appropriately carried by an arm 98 extending from the beam 11 after the space 29.

Secured to the bottom 63 of the receptacle 60 is a V-shaped strap 100 having an arm which is about horizontal when the receptacle is in its normal position as shown in FIGS. 3 and 4, and an upwardly and inwardly extending arm. Protruding downwardly from the horizontal arm of strap 100 is a cam track follower roller 101 which engages the outer periphery of the cam track 26, being urged thereagainst by the weight of the receptacle 60 which tends to pivot the receptacle 60 inward slightly. Thus, in its travel around the machine, the receptacle is rocked back and forth as the follower roller 101 moves along the surface of the cam track 26.

Secured at the inner end portion of strap 100 is a roller supporting bracket 102 which carries a tilting roller 103. The tilting roller 103 is adapted to cooperate with the cam 31 so as to tilt he receptacle inwardly or rearwardly as shown in FIG. 8 when the receptacle is in space 29.

In FIG. 9, it is seen that, if desired, an insert or spacer 110 may be bolted to the inside surface of the door 64 by means of bolt 111. The function of the spacer 110 is to adapt the receptacle 60 to receive smaller bags. It will be understood by those skilled in the art that various thicknesses of spacers may be employed, depending upon the size of bag 73 utilized.

In FIGS. 3, 6 and 9 it is seen that a flat strip 112 of resilient material such as rubber or the like is secured along the front edge portion of bottom 63 so that when the bag 73 slides from the receptacle 60, the bottom of the bag 73 is retarded in its outward movement, whereby the mouth of bag 73 clears the spout 71 before the entire bag 73 passes from the receptacle.

In FIGS. 1 and 3 it is seen that, in the present embodiment, the feed of material through the chute 55 may be regulated by readjusting the size of the exit opening from the chute 55 into the hopper 70. This is accomplished by providing a gate 120 which is of the same configuration as the lower portion of back 54 of chute 55. The gate 120 is pivotally connected by its upper edge to an intermediate portion of back 54, by means of a hinge 121, and its radial position may be adjusted by a set screw 122 which threadedly protrudes through back 54 so as to bear against the inner surface of gate 120. The lower end of gate 120 is on about the same plane with the exit opening of chute 55 and therefore determines the effective size of this opening.

OPERATION

From the foregoing description, the operation of the present device should be apparent. When the motor 17 is started, it drives through belt 18 and gear reducer 19, the sprocket 21 which drives the chain 22 and thereby drives the sprocket 23 to rotate the sleeve 16, thereby causing rotation of the turntable 40. The turntable 40 carries the chute, hopper and receptacle assemblies in a circular clockwise path such that each receptacle 60 is positioned successively in the quadrant of space 29. At that position, the roller 101 reaches the end of the cam track and hence is no longer controlled by the cam track 26.

With further travel of the assembly, the roller 103 is caught by the cam 31 and hence the receptacle 60, together with the hopper 70, is tilted rearwardly in the manner illustrated in FIG. 8. As the hopper 70 is tilted, the lever 34 strikes the tripping roller 33 and is rotated against spring tension of spring 95, sufficiently that the catches 91 are rotated away from the rod 90. This releases the door which swings by gravity to an open position. When the door 64 swings open, the lever 81 pushes rod 78 toward lever 77 and thereby rotates the lever to lift finger 75 from the latch plate 74.

With still further movement of the assembly, the roller 103 rides down the track again, permitting the receptacle 60 to approach its normal position once more. At this point, the roller 101 passes over the inwardly extending portion of the cam track 26 and is therefore again riding along the cam track 26. As the receptacle 60 passes roller 97 (seen in FIG. 2), the roller 97 strikes the cam 96, thereby closing door 64. Since spring 95 urges the catches 91 to a locking or closing position as seen in FIGS. 4 and 5, the catches 91 engage the rod 90 and hence retain the door in a closed position. Simultaneously with the closing of door 64, the rod 78 is returned to its original position such that the finger 75 is again urged against the latch plate 74.

In the operation of the present device, an operator is stationed adjacent the space 29 for the purpose of installing the self-sealing bags such as bag 73 within the receptacle 60 and with the mouth of the bags extending over the spout 71. This is accomplished between the time that the receptacle 60 is moving from the position shown in FIG. 8 to its normal position, and prior to the time that the cam 96 is engaged by the roller 97. The closing of the door 64 and the movement of finger 75 against latch plate 74 fixes the position of the bag within the receptacle 60 and with the mouth of the bag retained so that material fed into hopper 70 will pass through the spout 71 and be discharged out of the opening 72 into the bag. Suitable mechanism (not shown) feeds a measured amount of granular or aggregate material, or the like, to each chute 55, successively. This material is fed through the chute 55 into the hopper 70 and thence through spout 71 into the bag 73 retained within the closure 60. The gate 120 regulates the feed of the material from the chute 55 into the hopper 70. During this feeding time, the roller 101, riding along the cam track 26, rocks the receptacle 60 backwardly and forwardly through a limited amplitude so that the material in both the hopper 70 and in the bag will be constantly subjected to slight vibrations so that the material will be urged by gravity toward the bottom of the bag. Sufficient material will have been collected in the bag 73 that the bag 73 approaches a filled condition as the roller 101 approaches the arcuate node 30 which tends to urge the roller 101 outwardly whereby the receptacle 60 is moved to a more upright position, permitting the material within bag 73 to fill the inner and less accessible portions of the bag 73 by the action of both gravity and agitation.

When the receptacle 60 approaches the space 29, the bottom portion of the receptacle is tilted upwardly and rearwardly and the door 64 is opened as described above. The opening of door 64 permits the bag 73 to drop out of the receptacle 60. The rubber material 110 on the bottom 63 retards the forward movement of the bottom portion of the bag 73 sufficiently to permit the upper portion or mouth of the bag to clear the spout 71. After the bag 73 has been discharged in the filled condition from the receptacle 60, the receptacle is provided with a new bag 73 as described above, and the cycle is repeated.

It is readily seen that the present invention thus provides a quick and easy means for successively filling self-sealing bags with aggregate material, the material being vibrated sufficiently within the bag to be packed by gravity to substantially its maximum volume.

It will be obvious to those skilled in the art that many variations may be made to the embodiment herein chosen for the purpose of illustrating the present invention without departing from the scope thereof as defined by the appended claims.

I claim:

1. In a bagging apparatus, a base, a rotatable turntable carried by said base, a vibrator cam track supported from said base between said base and said turntable, and a plurality of bag filling assemblies carried by said turntable, each of said assemblies including a hopper, a spout in communication with and supported by said hopper, a receptacle rotatably supported under said spout for receiving and holding a bag, a cam follower supported from said receptacle and so positioned as to contact and ride along said cam track, a tilting cam follower supported by said receptacle and disposed rearwardly thereof, and a tilting cam mounted on said base inwardly of said cam track for contact by said tilting cam to tilt said receptacle and thereby discharge said bag.

2. An automatic bagging apparatus comprising a horizontal base, a turntable carried by said base for rotation in a horizontal plane, means for rotating said turntable, a plurality of radially spaced receptacles carried in pendulum fashion by said turntable for carrying bags to be filled, a tilting cam arranged in the path of travel of said receptacles, follower means carried by said receptacles and engageable with said tilting cam for temporarily tilting said receptacles successively rearwardly and then permitting said receptacles to return to their original position, a door on each of said receptacles, and means for opening said door as its associated receptacle is tilted rearward to discharge the bag carried by said receptacle.

3. In an automatic bagging apparatus, a receptacle, a door on said receptacle, means for opening said door to discharge a bag carried by said receptacle, means for closing said door after the same has been opened, a spout carried by said receptacle for receiving the mouth of the bag received in the receptacle, filling means connected to said spout for receiving and directing material through said spout to said bag, bag clamping means connected to said spout for clamping and retaining the mouth of said bag on said spout, and operating means interconnected between said door and said clamping means for actuating said clamping means as said door is opened to release said mouth of said bag.

4. An automatic bagging apparatus comprising, a horizontal base, a central standard extending in a vertical direction from said base, a turntable carried by said standard above said base for rotation in a horizontal plane, means for rotating said turntable, a cam track between said turntable and said base, said cam track having valleys and ridges along its outer surface, a plurality of radially spaced receptacles carried in pendulum fashion by said turntable for carrying bags to be filled, cam track follower means connected to said receptacles and engageable with said cam track for rocking said receptacles radially during the period in which said follower engages said cam track, and means for successively temporarily tilting said receptacles rearwardly and then permitting said receptacles to return to their original position, discharge means on each of said receptacles, and means for actuating said discharge means while its associated receptacle is tilted rearward to discharge the bag carried thereby.

5. An automatic bagging apparatus comprising a horizontal base, a central standard extending in a vertical direction from said base, a turntable carried by said standard above said base for rotation in a horizontal plane, means for rotating said turntable, a cam track between said turntable and said base, said cam track having an irregular outer surface, a plurality of radially spaced receptacles carried in pendulum fashion by said turntable for carrying bags to be filled, cam track follower means connected to said receptacles and engageable with said cam track for rocking said receptacles radially during the period in which said cam track follower engages said cam track, the ends of said cam track terminating in spaced relationship to each other, a tilting cam arranged in the path of travel of said receptacles between the ends of said cam track, follower means carried by said receptacles and engageable with said tilting cam for temporarily tilting said receptacles successively rearwardly and then permitting said receptacles to return to their original position, a door on each of said receptacles, means for opening said door as its associated receptacle is tilted rearward to discharge the bag carried by said receptacle, means for closing said door after the same has been opened, a spout carried by each of said receptacles in essentially parallel relationship to the bottom of its associated receptacle for receiving the mouth of the bag received in the receptacle, and filling means connected to said spout for receiving and directing material though said spout to said bag as said turntable turns.

6. An automatic bagging apparatus comprising a horizontal base, a central standard extending in a vertical direction from said base, a turntable carried by said standard above said base for rotation in a horizontal plane, means for rotating said turntable, a cam track between said turntable and said base, said cam track having an irregular outer surface, a plurality of radially spaced receptacles carried in pendulum fashion by said turntable for carrying bags to be filled, cam track follower means connected to said receptacles and engageable with said cam track for rocking said receptacles radially during the period in which said cam track follower engages said cam track, the ends of said cam track terminating in spaced relationship to each other, a tilting cam arranged in the path of travel of said receptacles between the ends of said cam track, follower means carried by said receptacles and engageable with said tilting cam for temporarily tilting said receptacles successively rearwardly and then permitting said receptacles to return to their original position, a door on each of said receptacles, means for opening said door when its associated receptacle is tilted rearward to discharge the bag carried by said receptacle, and filling means associated with each of said receptacles for receiving and directing material to said bags as said turntable turns.

7. An automatic bagging apparatus comprising a horizontal base, a central upstanding standard extending in a vertical direction from said base, turntable carried by said standard above said base for rotation in a horizontal plane, means for rotating said turntable, a cam track between said turntable and said base, said cam track being supported by said base and being generally concentric with respect to said standard, said cam track having an irregular outer surface, a plurality of radially spaced receptacles carried in pendulum fashion by said turntable for carrying bags to be filled, cam track follower means connected to said receptacles and engaging said cam track for rocking said receptacles radially during the period in which said cam track follower engages said cam track, said receptacles each being weighted for urging said receptacles inwardly for causing said cam track follower to be urged against said cam track, the ends of said cam track terminating in spaced relationship to each other, a tilting cam arranged in the path of travel of the said receptacles between the ends of said cam track, follower means carried by the inner portion of said receptacles and engageable with said tilting cam for temporarily tilting said receptacles successively rearwardly as said receptacles pass between the ends of said cam track, and then permitting said receptacles to return to their original positions, a door on each of said receptacles, means pivotally carried by said receptacles for latching said doors normally in closed positions, means carried by said horizontal base for engagement successively by said means for locking said doors to release said doors successively as said receptacles are tilted rearwardly to discharge the bags carried by said receptacles, means mounted on said base for closing said doors successively after said bags have been discharged from said receptacles, filling means associated with each of said receptacles for receiving and directing material to said bags as said turntable turns, latching means for engaging said bags in said receptacles and for holding said bags in prescribed positions in said receptacles with the mouths of said bags communicating with the said filling means, and actuator means connected between said latch means and said doors for releasing said latch means as its associated door is opened and for returning said latch means to its latch position upon the closing of said door, and means for rotating said turntable.

References Cited by the Examiner

UNITED STATES PATENTS

| | | | |
|---|---|---|---|
| 619,834 | 2/99 | Nickerson | 141—75 |
| 643,102 | 2/00 | Bates. | |
| 870,215 | 11/07 | Bates | 141—10 |
| 1,816,587 | 7/31 | Johns | 141—315 X |
| 2,691,476 | 10/54 | Petrea | 141—75 X |
| 2,720,375 | 10/55 | Carter | 141—68 X |

FOREIGN PATENTS 922,515   1/55   Germany.

LAVERN D. GEIGER, *Primary Examiner.*

RAPHAEL M. LUPO, *Examiner.*